United States Patent [19]

Shinagawa

[11] Patent Number: 5,003,594
[45] Date of Patent: Mar. 26, 1991

[54] PORTABLE ELECTRONIC DEVICE AND ITS SECRET INFORMATION COLLATION METHOD

[75] Inventor: Toru Shinagawa, Toride, Japan
[73] Assignee: Hitachi Maxell, Ltd., Osaka, Japan
[21] Appl. No.: 454,032
[22] Filed: Dec. 20, 1989
[51] Int. Cl.$^5$ .............................................. H04K 1/00
[52] U.S. Cl. ...................................... 380/24; 235/382
[58] Field of Search ............................ 380/24; 235/382

[56] References Cited

U.S. PATENT DOCUMENTS

| | | | |
|---|---|---|---|
| 4,271,482 | 6/1981 | Giraud | 380/24 |
| 4,450,535 | 5/1984 | de Pommery et al. | 380/24 |
| 4,453,074 | 6/1984 | Weinstein | 380/24 |
| 4,575,621 | 3/1986 | Dreifus | 380/24 |
| 4,701,601 | 10/1987 | Francini et al. | 380/24 |
| 4,746,788 | 5/1988 | Kawana | 380/24 |
| 4,827,113 | 5/1989 | Rikuna | 380/24 |
| 4,827,512 | 5/1989 | Hirokawa et al. | 380/24 |

FOREIGN PATENT DOCUMENTS

52-7646 1/1977 Japan .

*Primary Examiner*—Thomas H. Tarcza
*Assistant Examiner*—David Cain

[57] ABSTRACT

A secret information collation method is used between electronic apparatuses that included a portable electronic device and an information processing device. The portable electronic device can include an arithmetic processing section and a memory section for storing therein a processing program to be executed by the arithmetic processing section and first secret information. The portable electronic device collating second secret information inputted from the outside with the first secret information and performing predetermined operation in response to an operation request from the outside satisfying predetermined secret information relationship. A portable electronic device includes an arithmetic processing section and a memory section for storing therein a processing program to be executed by the arithmetic processing section and first secret information such as a secret identification number. The memory section stores a secret information input processing program for calling upon an external information processing device to transfer second secret information corresponding to the first secret information, and a secret information collation program.

16 Claims, 4 Drawing Sheets

DIRECTION OF INSERTION

PORTABLE ELECTRONIC DEVICE AND ITS SECRET INFORMATION COLLATION METHOD

BACKGROUND OF THE INVENTION

The present invention relates to a portable electronic device and its secret information collation method, and in particular to a secret information collation scheme for IC card data processing system in which it is hard to perform illegal access from the readout terminal side and security of IC cards can be improved.

In a conventional information processing system using IC cards or the like as described in JP-A-52-7646, for example, secret information such as a secret identification number is collated at the IC card side in response to a directive given from the terminal side. Upon coincidence, access to a memory contained in the IC card is permitted and transactions processing can be continued. When the results in the above described collation is noncoincidence, the number of times of noncoincidence is administered. If the number of times of error reaches a predetermined number or more, the illegal IC card is excluded. By doing so, illegal use of an IC card caused by forgery or fraud is prevented.

SUMMARY OF THE INVENTION

In a conventional IC card, however, operation is performed in response to a directive issued from the outside. Under the above described collation of information contained in the IC card and error administration alone, therefore, a person skilled in the operation can perform illegal operations with respect to the IC card and find out secret information stored in a memory of the IC card. There is also a danger of secret information such as a secret identification number being stolen. The term secret as used in the current disclosure does not include by definition the term confidential.

An object of the present invention is to solve the above described problems of the prior art and provide a secret information collation method for a portable electronic device such as an IC card which makes it difficult to gain illegal access from the terminal side and steal secret information stored inside and which is excellent in preserving secrecy.

In accordance with the present invention, there is provided a secret information collation method used between electronic apparatuses including a portable electronic device and an information processing device. The portable electronic device can include an arithmetic processing section and a memory section for storing therein a processing program to be executed by the arithmetic processing section and first secret information the portable electronic device collating second secret information inputted from the outside with the first secret information and performing predetermined operation in response to an operation request from the outside satisfying predetermined secret information relationship. The information processing device transmitting the second secret information to the electronic device and addressing the operation request to the electronic device, the secret information collation method includes the steps of outputting, from the electronic device to the information processing device, a request for transmission of the second secret information, transmitting the second secret information from the information processing device to the electronic device upon input of the transmission request from the electronic device to the information processing device, collating, in the electronic device, the second secret information with the first secret information stored in the memory section of the electronic device upon input of the second secret information, and responding to the operation request addressed from the information processing device upon recognition of satisfaction of predetermined secret information relationship.

Further, in accordance with the present invention, there is also provided a portable electronic device including an arithmetic processing section and a memory section for storing therein a processing program to be executed by said arithmetic processing section and first secret information such as a secret identification number, the memory section storing therein a secret information input processing program for calling upon an external information processing device to transfer second secret information corresponding to the first secret information, and a secret information collation program.

In this way, secret information (such as a secret identification number) which is important in system operation is stored beforehand ,in a portable electronic device (such as an IC card). The portable electronic device controls an external device, which is the other party, in accordance with a processing program stored therein so that an operator of the external device may input secret information to the external device and the secret information thus inputted may be transferred from the external device.

When the portable electronic device is an IC card and the external device is a terminal device wherein the IC card is inserted, for example, the terminal device becomes active and displays an input message such as a secret identification number on its display unit. The terminal device derives secret information such as a secret identification number inputted via a keyboard by an operator in accordance with the input message. The terminal device then transmits the secret information thus derived or secret information, which has already been inputted in accordance with a previous message and which is held within the terminal device, to the IC card.

Upon receiving secret information, the electronic device such as the IC card compares secret information transmitted from the external device with secret information held in the internal memory. Depending upon whether the result is coincidence or not, the electronic device continues the processing or stops or inhibits the operation.

In this way, the portable electronic device addresses a request for collation of secret information, makes the external device, which is the other party, transfer secret information derived by the external device, and performs collation internally, illegal access from the terminal device being made difficult. Further, readout of secret information to the outside becomes almost impossible. As a result, security of a portable electronic device against unfair practices such as forgery and fraud can be improved.

DESCRIPTION OF THE PREFERRED EMBODIMENTS

A preferred embodiment of the present invention will hereafter be described in detail by referring to drawings.

Figure 1:
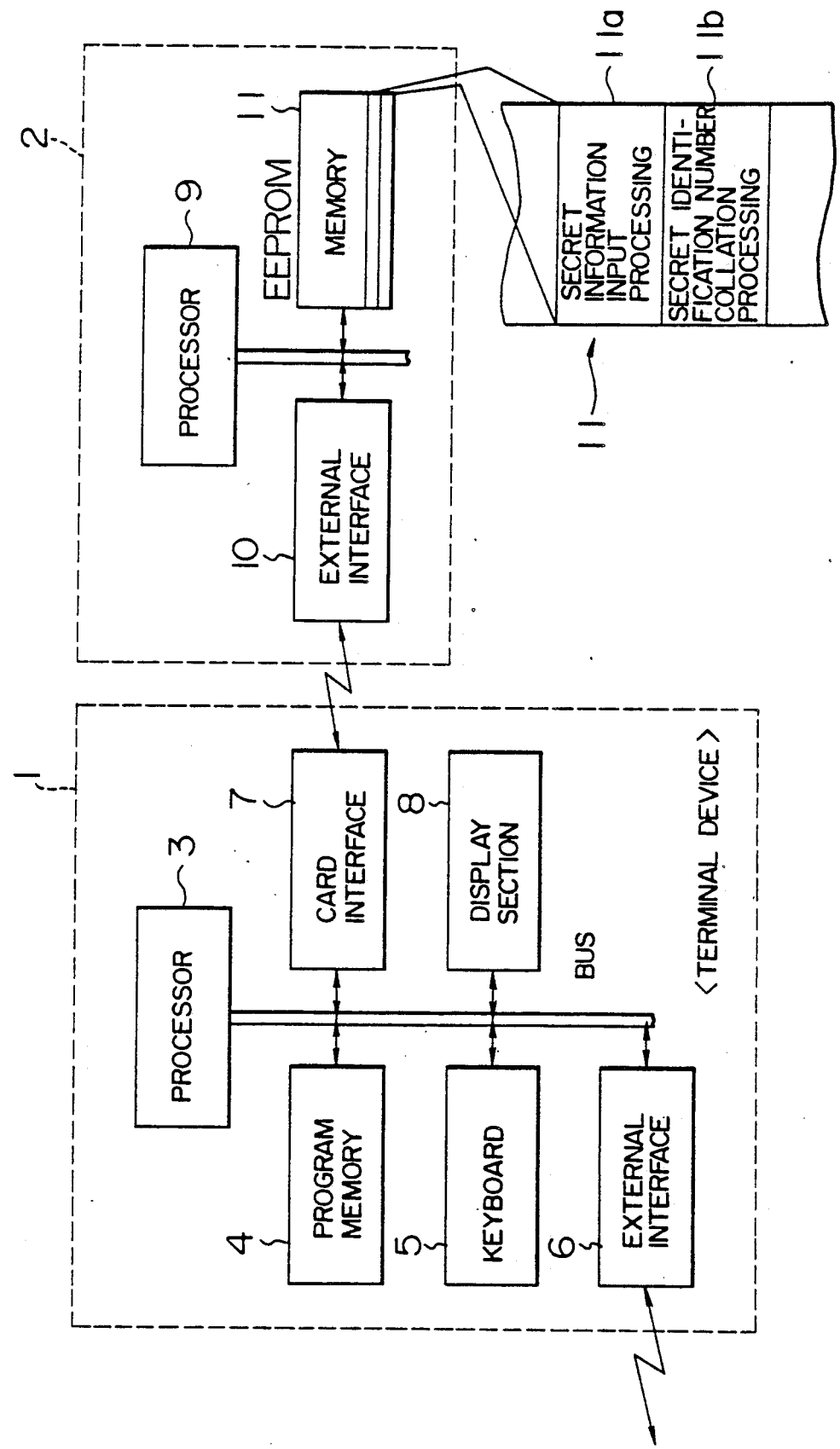
FIG. 1 is a block configuration diagram of a terminal device and an IC card according to a preferred embodiment of the present invention.

With reference to FIG. 1, numeral 1 denotes a handy terminal device (hereafter abbreviated to terminal device) having therein a card interface 7 such as an IC card reader/writer. An IC card 2 is mounted on the above described card interface 7 to send/receive information to/from the card interface 7. This card interface 7 has electrical interface function with respect to the IC card 2 and is coupled to the IC card 2 via a connector or in a noncontact state.

The terminal device 1 has an IC card control operation mode in which the terminal device controls its hardware and operates in response to commands given from the IC card 2 (or the terminal device 1 may be a terminal device set in this control operation state). In addition to the above described card interface 7, the terminal device 1 comprises an external interface 6 for communicating with an external host computer or the like, a program memory 4 for storing therein information and a processing program, a keyboard 5 for inputting a secret identification number and the like, a display section 8 having an LCD display for performing guidance display and the like, and a processor 3 for controlling these sections.

On the other hand, the IC card 2 comprises a memory 11 for storing therein processing programs and information such as a secret identification number and transactions data, an external interface 10 for external connection, and a processor 9 for controlling these sections. Besides the secret identification number, transactions data and various processing programs, a secret information input processing program 11a, which is used by the IC card 2 to call upon the terminal device 1 to transfer secret information when the IC card 2 is inserted into the terminal device 1, and a secret identification number collation processing program 11b are stored beforehand in the memory 11. The memory 11 comprises a RAM and an EEPROM. In particular, the above described programs may be beforehand in the EEPROM in the down load form. It doesn't matter what kinds of memories programs are stored in.

Figure 2:
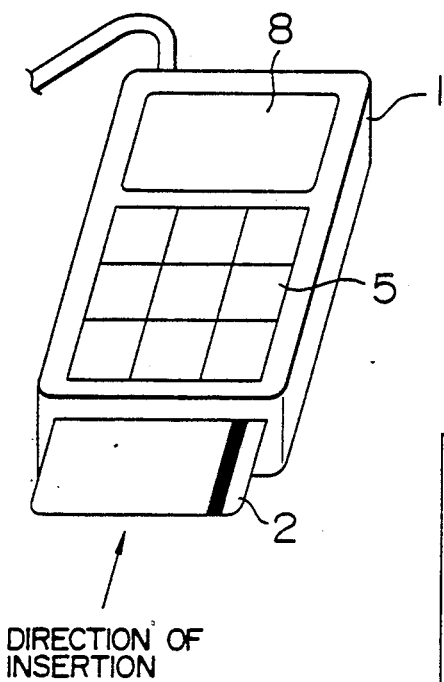
FIG. 2 is an exterior view of the terminal device shown in FIG. 1.

FIG. 2 is an example of an exterior view of the terminal device 1 and the IC card 2. When the IC card 2 is inserted into the terminal device 1, the IC card 2 is connected to the processor 3 via a bus by the IC card interface 7. Power is supplied from the terminal device 1 to the IC card 2 to activate the IC card 2. In the initial state caused by insertion of the IC card 2, the terminal device 1 is set at such an operation mode that the terminal device 1 is controlled by the IC card.

Figure 4A:
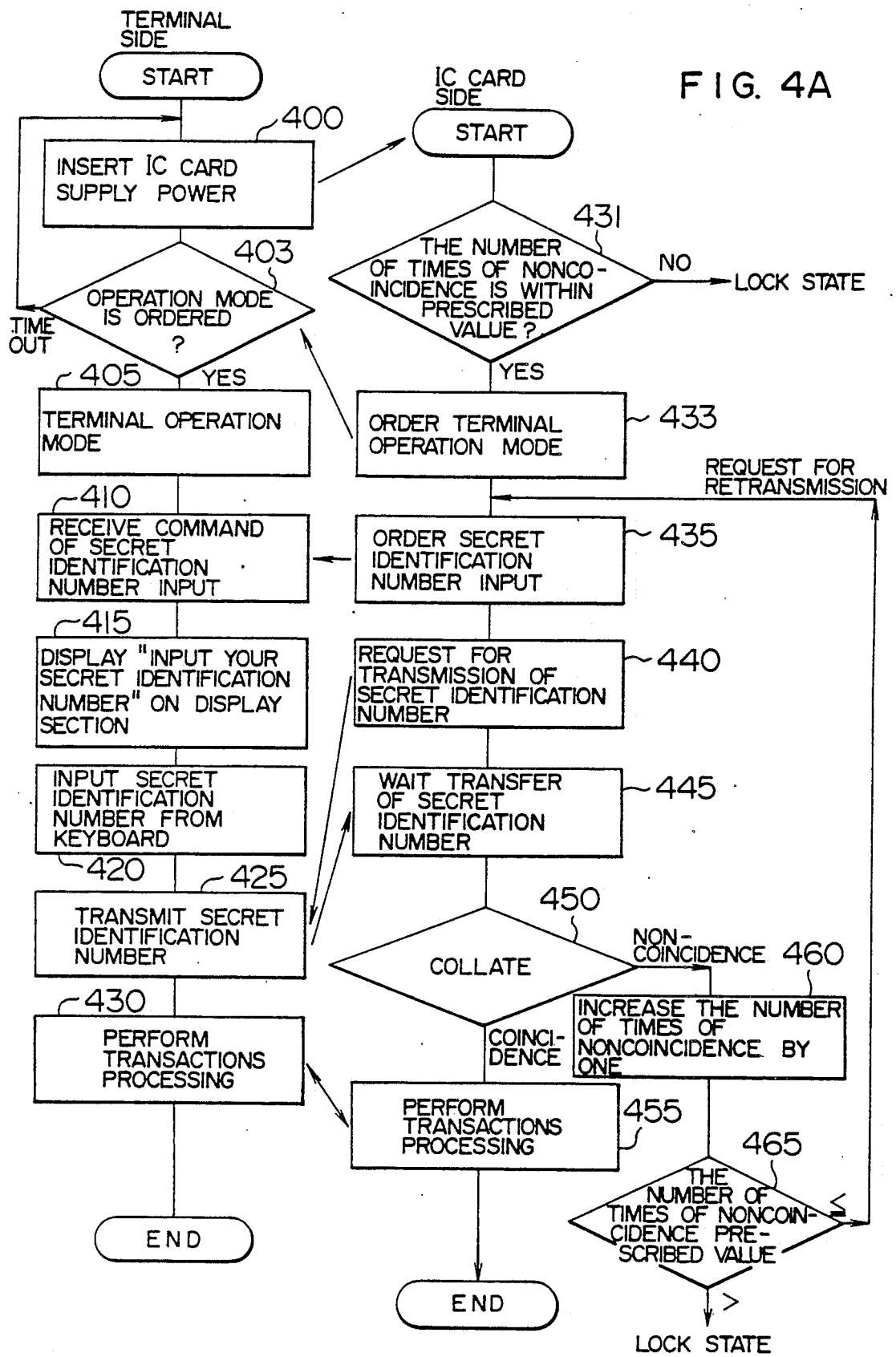
FIGS. 4A and 4B are flow charts showing the operation of the terminal device and the IC card.

Upon receiving power from the terminal device 1, the IC card 2 first starts the secret information input processing program 11a at predetermined timing. Processing of the secret information input processing program 11a is control processing of the IC card 2 upon the terminal device 1 whereby the IC card 2 controls the terminal device 1. In this processing, the terminal device 1 first executes input processing of a secret identification number and a series of operation is performed under the control of the IC card 2 as shown in FIG. 4A until the inputted secret identification number is transmitted to the IC card 2.

Cooperative processing between the IC card 2 and the terminal device 1 performed when the above described secret information processing program 11a and secret identification number collation program 11b are started will now be described.

First of all, when an IC card 2 meeting standards has been inserted into the terminal device 1, the terminal device 1 supplies power to the IC card 2 to activate the IC card 2 (step 400). The IC card 2 activated by this power supply compares the number of times of secret identification number collation noncoincidence held in the memory 11 with a prescribed value (step 431). If the number of times of noncoincidence exceeds the prescribed number of times, a lock state is caused and transactions processing is not performed. Unless the number of times of noncoincidence exceeds the prescribed value, the IC card 2 transmits a predetermined command to the terminal device and sets the terminal device 1 into the operation mode (step 433). While waiting for the order of the operation mode, the terminal device supervises timeout. If the operation mode is not ordered for a prescribed time or longer, the terminal device returns to its initial state (step 403). In accordance with the secret information input processing program 11a comprising steps 435 to 445, the IC card 2 transmits a command of secret identification number input toward the terminal device 1 (step 435). Upon input of this command, the terminal device 1 confirms the secret identification number input command (step 410). The terminal device then displays a message "Input your secret identification number", for example, on the display section 8 (step 415).

If the predetermined secret identification number is inputted from the keyboard 5 on the basis of the order displayed on the display section 8, the secret identification number thus inputted is temporarily stored into the program memory 4.

If a request for transmission of the secret identification number is then inputted from the IC card 2 (step 440), the terminal device 1 transfers the inputted identification number described before to the IC card 2 on the basis of this command.

The IC card 2 waits until this secret identification number is transferred (step 445). Upon transfer of the secret identification number, the IC card 2 begins processing based upon the secret identification number collation processing program 11b comprising steps 450 to 465.

In the processing of this secret identification number processing program 11b, the secret identification number transferred from the terminal device 1 is compared with the secret identification number stored in the memory 11 included in the IC card 2 (step 450). In case of coincidence, transactions processing is performed between the IC card 2 and the terminal device 1 (steps 430 and 455).

On the other hand, unless the secret identification numbers are noncoincident as a result of collation processing at the step 450, the number of times of noncoincidence is increased by one at step 460. At step 465, this count is compared with the predetermined prescribed value stored in the memory 11. If the count is less than this prescribed value, the IC card returns to the step 435 to transmit a request for reinput of the secret identification number to the terminal device 1.

If it is judged at the step 465 that the prescribed value is exceeded, the IC card 2 itself is brought into the lock state and does not operate thereafter. The IC card 2 thus becomes unusable.

In the above described collation operation at step 450, transaction processing is begun when the predetermined secret identification number stored in the memory 11 of the IC card 2 is identical with the secret identification number inputted from the terminal device 1. However, it is not necessary that they are completely identical, but such codes having fixed mutual interrelation that all digits become zero when respective corresponding digits are added, for example, may be used.

Figure 5:
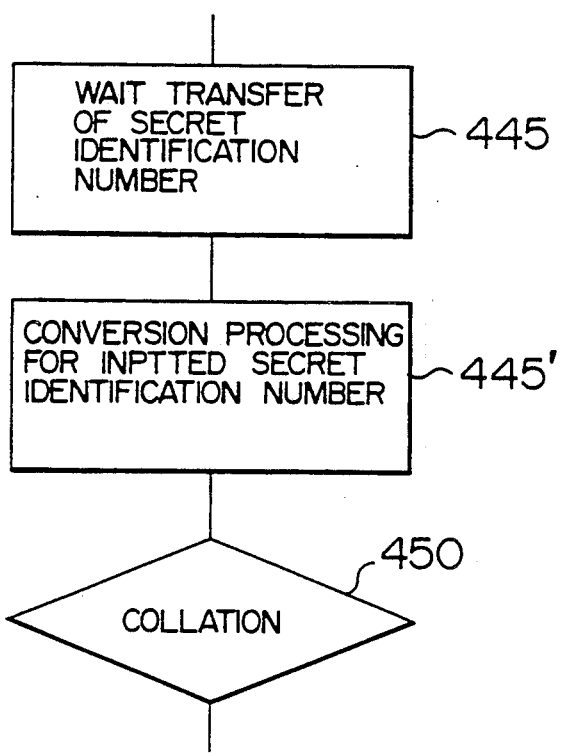
FIG. 5 is a flow chart showing an example of a variant.

Further, the degree of security of secret identification number collation may also be raised by disposing step 445', whereat predetermined conversion processing is applied to the inputted secret identification number, between the step 445, whereat transfer of the secret identification number is waited, and the collation step succeeding the step 445 as exemplified in FIG. 5 and thereby implementing a configuration using a secret identification number which has undergone so-called scramble processing.

Figure 4B:
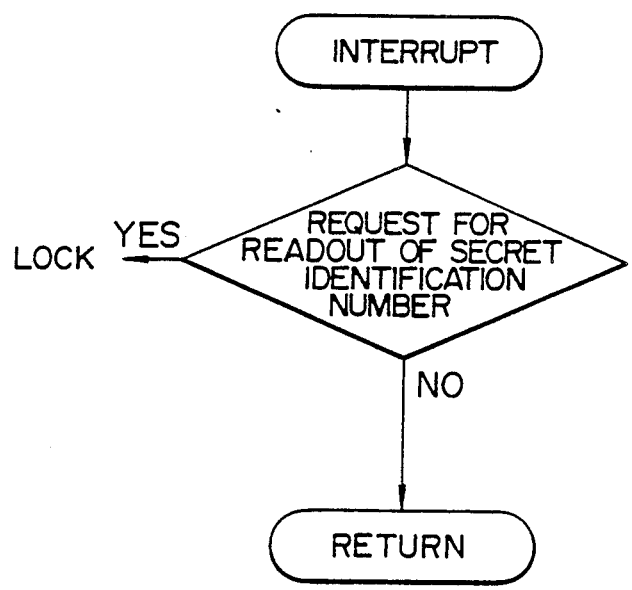

Further, as shown in FIG. 4B, it is also possible to use such a configuration that the IC card 2 is immediately brought into the lock state by interrupt processing if there should be inputted from the terminal device 1 a command requesting for readout of the secret identification number incorporated in the memory of IC card 2.

In the processing heretofore described, only commands for activating the hardware of the terminal device 1 are transmitted from the IC card 2 to the terminal device 1. The terminal device 1 need not recognize or judge that the processing is input processing of a secret identification number, for example.

Figure 3A:
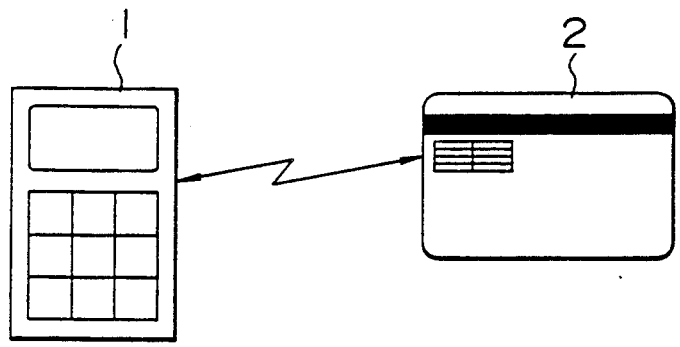
FIG. 3A is an exterior view of the terminal device having a display section and an input section such as a keyboard.
Figure 3B:
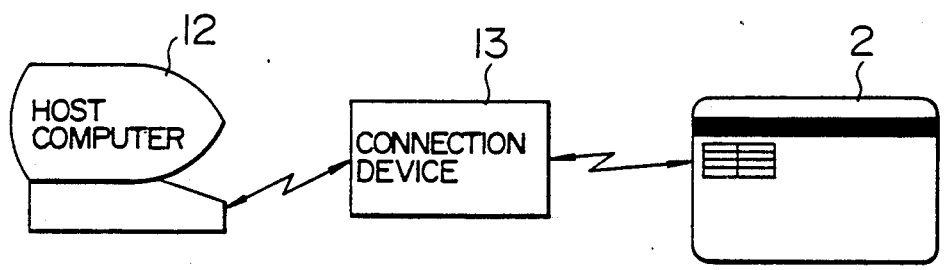
FIG. 3B is a configuration diagram of a preferred embodiment using a host computer.

FIGS. 3A and 3B show examples of the whole configuration. FIG. 3A shows a case where the terminal device 1 having the display section and the input section such as a keyboard as described above is used. FIG. 3A thus corresponds to FIG. 1. In this case, the terminal device 1 may be further connected to a host computer. FIG. 3B shows a system so configured that a connection device 13 may be provided with a part of the function of the terminal device 1 and a host computer 12 such as a personal computer may be connected to the connection device 13 via a line or the like.

Figure 3C:
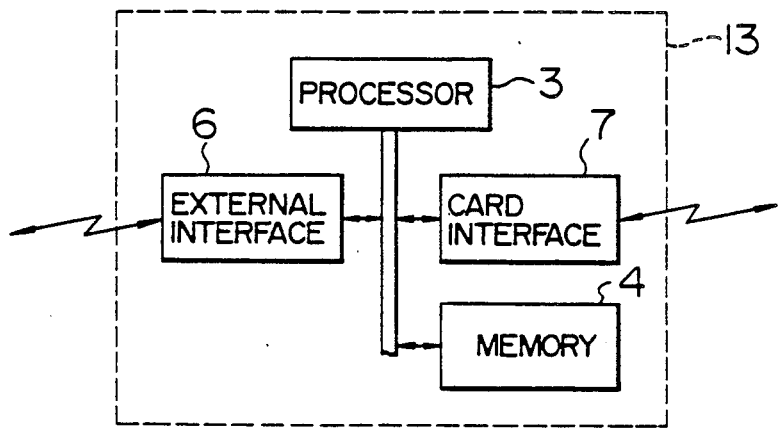
FIG. 3C is a detailed configuration diagram of a connection device used in FIG. 3B.

In the same way as the terminal device 1, the host computer 12 shown in FIG. 3B has an input section comprising a keyboard and a display section comprising a display. The connection device 13 comprises neither an input section nor a display. As shown in a block diagram of FIG. 3C, the connection device 13 comprises the memory 4, the external interface 6, the card interface 7, and the processor 3. In this system, the connection device 13 has only function of connecting and activating the IC card 2 and external communication function. A request for inputting a secret identification number transmitted from the IC card 2 is handled by the host computer 12. The host computer 12 is controlled by the IC card 2.

In case secret information is a secret identification number, the IC card 2 thus orders and displays input of the secret identification number. As a result, the terminal device 1 or the host computer 12 is controlled, and the IC card 2 can administer the operation of the terminal device 1 or the host computer 12.

In the foregoing description of the preferred embodiment, the IC card has been mentioned as an example of a portable electronic device, and its operation is lock if number of collation errors of secret information exceeds a predetermined number. Examples of the lock state of the IC card are disabled read and write of information from the outside, and disabled collation. locked if collation of secret information results in an error a predetermined number of times or more. For example, it is made impossible to read, write and collate information from the outside.

The terminal device or the host computer in the preferred embodiment heretofore described is not limited to that shown in FIG. 3A or 3B, but may be an exclusive terminal device such as an ATM.

Further, by using a rewritable device (such as an EEPROM) in a part of the memory 11 included in the IC card 2 in the preferred embodiment, the processing program shown in FIGS. 4A and 4B can be rewritten to Adapt the collation non-coincidence processing to respective applications. make the processing, which is performed when collation results in noncoincidence, suitable to application.

Further, since processing procedure such as collation is defined by the processing program stored within a portable electronic device such as the IC card 2, it is possible to perform collation processing to such a degree as to meet requirements, and processing which differs depending upon each portable electronic device can be realized in an identical system. As a result, a flexible system can be constructed.

As a matter of fact, the secret information such as a secret identification number in the preferred embodiment may be information held within the terminal device or the host computer instead of information inputted via the input section such as a keyboard. Input processing of a secret identification number may be performed beforehand in the terminal device or the like, and a secret identification number inputted beforehand and held in the device may be transmitted to the IC card in accordance with a command stored in the IC card.

In this way, secret information which is important in system operation is stored beforehand in a portable electronic device, and the portable electronic device controls an external device, which is the other party, in accordance with a processing program stored therein so that an operator of the external device may input secret information to the external device and the secret information thus inputted may be transferred from the external device. Therefore, illegal access from the external device to the portable electronic device is prevented, and readout of secret information to the outside becomes substantially impossible. As a result, security of a portable electronic device against unfair practices such as forgery and fraud can be improved.

I claim:

1. A confidential information collation method used between electronic apparatuses including a portable electronic device and an information processing device, said portable electronic device including an arithmetic processing section and a memory section for storing therein a processing program to be executed by said arithmetic processing section and first confidential information, said portable electronic device collating second confidential information inputted from the outside with said first confidential and performing predetermined confidential information relationship, said information processing device transmitting said second confidential information to said electronic device and addressing said operation request to said electronic device, said confidential information collation method comprising the steps of:

outputting, from said electronic device to said information processing device, a request for transmission of said second confidential information, transmitting said second confidential information from said information processing device to said electronic device upon of said transmission request from said electronic device to said information processing device;

collating, in said electronic device, said confidential information with the first confidential information stored in the memory section of said electronic device upon input of said second confidential information; and responding to the operation request addressed from said information processing device upon recognition of satisfaction of predetermined confidential information relationship.

2. A confidential information collation method according to claim 1, wherein said electronic device comprises an IC card.

3. A confidential information collation method according to claim 1, wherein said first confidential information is equivalent to said second confidential information.

4. A confidential information collation method according to claim 1, wherein said second confidential information after it has undergone predetermined conversion processing is equivalent to said first confidential information.

5. A confidential information collation method according to claim 1, wherein said information processing device comprises a display section for displaying a message to urge input of said second confidential information to said information processing device; and the message is displayed on said display section in response to a request, addressed by said electronic device, for transmission of said second confidential information.

6. A confidential information collation method according to claim 1, wherein said electronic device outputs a retransmission request to said information processing device in, case satisfaction of predetermined confidential information relationship is not recognized in collation of said first confidential information with said second confidential information;

said electronic device counts times of nonrecognition of satisfaction of predetermined secret information relationship; and said electronic device rejects an operation request addressed by said information processing device when said count exceeds a predetermined value.

7. A secret information collation method according to claim 1, wherein if said information processing device makes inquiries about said first confidential information, said electronic device rejects an operation request from said information processing device.

8. A confidential information collation method according to claim 1, wherein after said second confidential information has been inputted to said information processing device via an input section thereof, said information processing device holds therein said second, confidential information and transmits said second confidential information to said electronic device in response to a request addressed by said electronic device.

9. A portable electronic device including an arithmetic processing section and a memory section for storing therein a processing program to be executed by said arithmetic processing section and first confidential information such as a confidential identification number, said memory section storing therein a confidential input processing program for calling upon an external information processing device to transfer second confidential information corresponding to said first confidential information; and a confidential information collation program.

10. A portable electronic device according to claim 9, wherein said electronic device comprises an IC card having an EEPROM as said memory section.

11. A portable electronic device according to claim 10, wherein said electronic device comprises an IC card having said confidential information processing program described on said EEPROM by means of down load processing.

12. A portable electronic device according to claim 9, wherein said electronic device comprises an IC card, and the IC card comprises:

a noncoincidence times counter for counting times of noncoincidence in said confidential information collation; and inhibit means for making it impossible to read, write and collate information from the outside when the number of times of noncoincidence is not less than a predetermined number.

13. A portable electronic device according to claim 9, wherein said electronic device comprises an IC card having means for inhibiting collation when said electronic device receives an inquiry command of the first confidential information from the outside.

14. A confidential information collation method between a portable electronic device including an arithmetic processing section and a memory section storing therein a processing information to be executed by the arithmetic processing section and first confidential information, and an information processing device comprising the steps of:

(a) setting the information processing device in a predetermined operation mode controlled by the portable electronic device;

(b) directing from the portable electronic device to the information processing device for transmission of a second confidential information to be collated; and (c) collating the transmitted second confidential information with the first confidential information stored in the memory section of the portable electronic device.

15. A confidential information collation method according to claim 14 further comprising the step of:

(d) supplying power from the information processing device to the portable electronic device to activate the portable electronic device.

16. A portable electronic device comprising:

an arithmetic processing section and a memory section storing a first confidential information, a processing program for setting an external information processing device in a predetermined operation mode controlled thereby and to be executed by said arithmetic processing section, a confidential information input processing program for directing the external information processing device to transfer a second confidential information to be collated; and a confidential information collation program for controlling the first confidential information stored in the memory section and the second confidential information transferred from the external information processing device.

* * * * *